(12) United States Patent
Schuck

(10) Patent No.: US 9,399,448 B1
(45) Date of Patent: Jul. 26, 2016

(54) TOWED VEHICLE BRAKE ACTUATION APPARATUS

(71) Applicant: Peter Schuck, Newburgh, IN (US)

(72) Inventor: Peter Schuck, Newburgh, IN (US)

( * ) Notice: Subject to any disclaimer, the term of this patent is extended or adjusted under 35 U.S.C. 154(b) by 0 days.

(21) Appl. No.: 14/598,914

(22) Filed: Jan. 16, 2015

(51) Int. Cl.
*B60T 7/20* (2006.01)
*B60T 7/16* (2006.01)

(52) U.S. Cl.
CPC .... *B60T 7/20* (2013.01); *B60T 7/16* (2013.01)

(58) Field of Classification Search
CPC ............... B60T 7/12; B60T 7/16; B60T 7/20
USPC ...... 188/3 R, 3 H, 110, 112 R, 135, 137, 138, 188/140 R, 141; 303/3, 7, 20, 123
See application file for complete search history.

(56) References Cited

U.S. PATENT DOCUMENTS

| | | | | |
|---|---|---|---|---|
| 2,177,469 A * | 10/1939 | White | ................... | B60T 17/223 188/152 |
| 2,711,228 A * | 6/1955 | Shank | ................... | B60T 17/223 303/7 |
| 3,866,719 A * | 2/1975 | Streutker | .............. | B60T 17/223 188/3 R |
| 3,991,609 A * | 11/1976 | Asmus | ...................... | G01L 5/28 73/132 |
| 5,915,798 A * | 6/1999 | Ford | ...................... | B60T 11/108 303/7 |
| 6,126,246 A * | 10/2000 | Decker, Sr. | ........... | B60T 17/223 188/112 R |
| 6,158,823 A * | 12/2000 | Schuck | ................... | B60T 13/46 303/7 |
| 6,634,466 B1 * | 10/2003 | Brock | ....................... | B60T 7/04 188/3 R |
| D498,190 S * | 11/2004 | Brock | ......................... | D12/180 |
| 6,918,466 B1 * | 7/2005 | Decker, Jr. | ................ | B60T 7/04 188/3 R |
| 7,699,406 B1 * | 4/2010 | Schuck, II | ................ | B60T 7/20 188/112 R |
| 8,430,458 B2 * | 4/2013 | Kaminski | ................. | B60T 7/06 701/70 |
| 8,662,262 B1 * | 3/2014 | Decker, Jr. | ................ | B60T 7/20 188/112 R |
| 2013/0238205 A1 * | 9/2013 | Edwards | ................... | B60T 7/12 701/70 |

OTHER PUBLICATIONS

Roadmaster, Portable Braking System Model No. 9300, Mar. 2006.*

* cited by examiner

*Primary Examiner* — Thomas J Williams
(74) *Attorney, Agent, or Firm* — Gary K. Price

(57) ABSTRACT

A brake actuation apparatus and method are described. An air cylinder is pivotally attached to an operating unit of the brake actuation apparatus. The air cylinder extends away from the operating unit and is configured to connect to the brake pedal to actuate a brake of the towed vehicle through the brake pedal. A stabilizing cable has one end attached to the firewall of the towed vehicle and an opposite end releaseably attached to the brake actuation apparatus, such that when the air cylinder applies pressure to the towed vehicle's brake pedal, the stabilizer cable transfers reaction to the towed vehicle's firewall and supplies a stable anchor point.

17 Claims, 8 Drawing Sheets

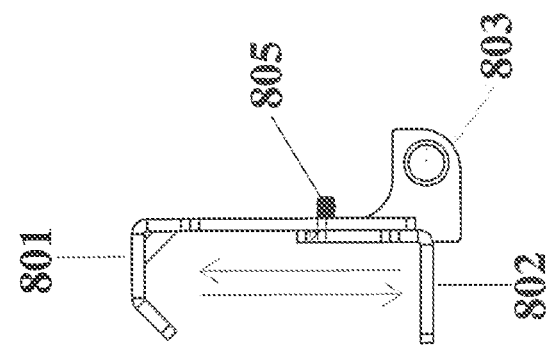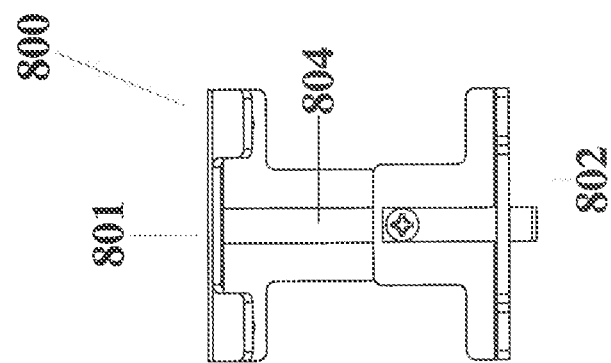
Fig. 6

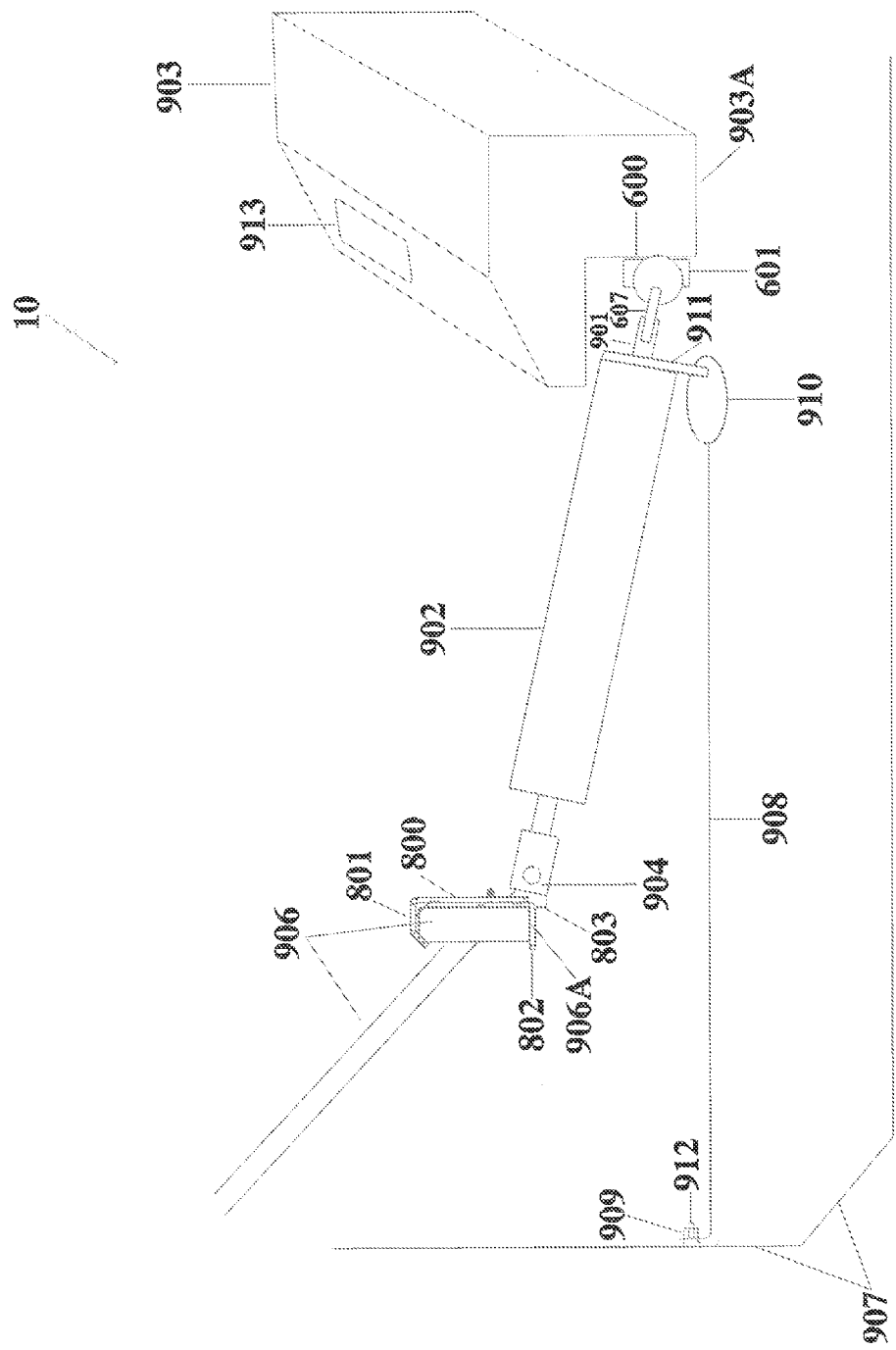

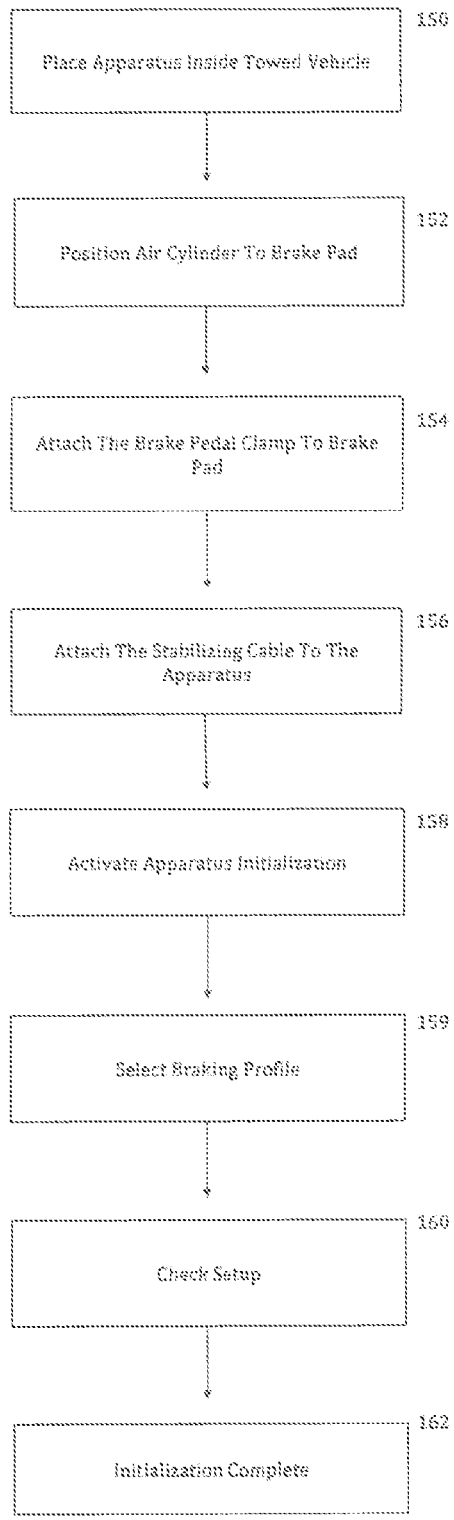

TOWED VEHICLE BRAKE ACTUATION APPARATUS

CROSS REFERENCES TO RELATED APPLICATIONS

U.S. Provisional Application for Patent No. 61/965,154, filed Jan. 24, 2014, with title "Towed Vehicle Brake Actuation Apparatus" which is hereby incorporated by reference. Applicant claims priority pursuant to 35 U.S.C. Par. 119(e)(i).

STATEMENT AS TO RIGHTS TO INVENTIONS MADE UNDER FEDERALLY SPONSORED RESEARCH AND DEVELOPMENT

Not Applicable.

BACKGROUND OF THE INVENTION

1. Field of the Invention

The present invention relates to a braking apparatus, and more particularly to a supplemental brake system for towed vehicles.

2. Brief Description of Prior Art

People who often tow vehicles, such as those who tow automobiles with their recreational vehicles, often encounter towing problems. One common towing problem pertains to the braking system of the towing vehicle. When the vehicle is being towed, the towed vehicle may rely on the braking system of the towing vehicle for stopping or slowing down. This situation typically produces undue stress on the towing vehicle's braking system. The undue stress may cause the brake pads of the towing vehicle to wear out fast. Thus, the lifespan of the towing vehicle's braking system could be significantly shortened. This situation may render the towing vehicle prone to accidents, as it may easily lose its brakes.

Auxiliary braking controller systems come in many different configurations. For use with recreational vehicles for example, portable auxiliary braking systems have been developed that can be placed on or in front of the driver's seat of the towed vehicle and then attached to the brake pedal. When the user has arrived at the parking destination, the portable system is removed from the towed vehicle so that the towed vehicle can be driven. When the user is ready to move to a new destination, the portable system is reinstalled. Since the braking system might be installed and removed multiple times in a day in some situations, size, weight, and ease of use are important design considerations.

The present invention recognizes the limited nature of conventional auxiliary braking systems for towed vehicles and offers a solution to the problem of providing a more accurate braking system that can also be more easily removed and assembled with less components. Thus, the present invention presents an improvement to traditional supplemental braking systems for towed vehicles.

SUMMARY OF THE INVENTION

The towed vehicle brake actuation apparatus incorporates a ball and socket arrangement connecting a brake actuator to a brake pedal in a towed vehicle as well as a brake pedal clamp that simplifies installation and precludes having to readjust componentry each time the apparatus is installed for use.

BRIEF DESCRIPTION OF THE DRAWINGS

FIG. 6 illustrates a "set it once" slip on brake pedal clamp.

FIG. 7 illustrates an overview of the apparatus' mechanical parts.

FIG. 8 is a process flow diagram of initializing the apparatus of FIG. 1 inside a towed vehicle.

DESCRIPTION OF THE PREFERRED EMBODIMENT

Figure 1:
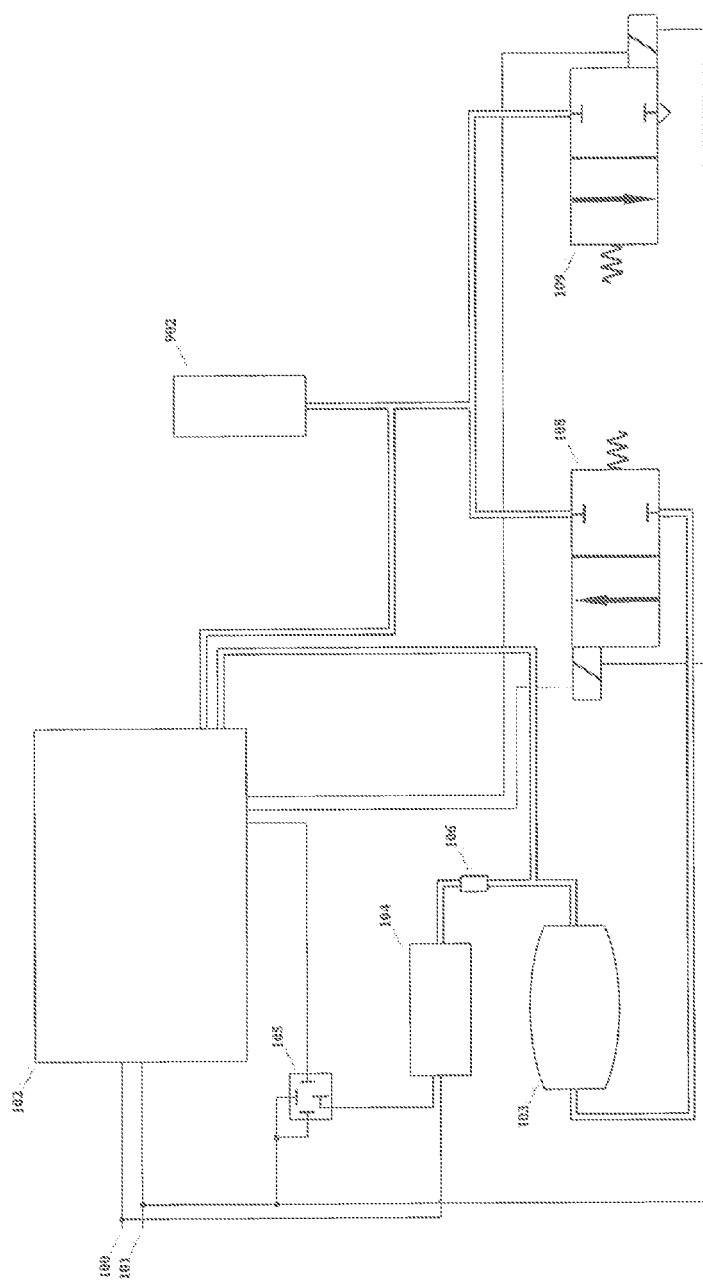
FIG. 1 is an overview of the preferred embodiment of the present invention, a towed vehicle brake actuation apparatus.

The present invention is directed to a braking apparatus for use in towing vehicles. The portable, easy-to-use, brake actuation apparatus provides great benefits in safety for those who tow another vehicle and for those on the roads around them. By making this apparatus easier to install, easier to use, and easier to store when not being used, this apparatus is used more frequently. The more frequently it is used, the more likely it is to protect its users and others on the road. The brake actuation apparatus described below is not only compact, powerful, accurate, and easy-to-use, but it is easy to install and easy to remove. In the broadest context, the towed vehicle brake actuation apparatus of the present invention consists of components configured and correlated with respect to each other so as to attain the desired objective.

Referring now to the drawings, FIG. 7 depicts a side view of a towed vehicle brake actuation apparatus of the present invention, designated as numeral 10. As illustrated, the apparatus 10 generally includes an operating unit 903 that during application rests on the floorboard of the vehicle being towed, an air cylinder 902 having a first end attached to the operating unit 903 using a ball and socket mount 600 and an opposite end attached to a brake pedal clamp 800 that is adjusted to the brake pedal of the vehicle being towed. The apparatus 10 further includes a stabilizing cable 908 that preferably has one end attached to the firewall of the towed vehicle, and the opposite end releaseably attached to the apparatus 10. As will be further described, the stabilizing cable 908 for stabilizing the positioning of the apparatus 10 during application.

Referring to FIG. 6, the brake pedal clamp 800 is adjusted to the brake pedal of the towing vehicle 906 (see FIG. 7) by loosening adjusting knob 805 and tightening the pedal clamp 800 to the towed vehicle's brake pedal pad 906. The clamp 800 includes a hook lip 801 that slips over the top of the vehicle's brake pedal pad 906 and a flat lip 802 that slips under the bottom of the brake pedal pad 906. The knob 805 is attached to the flat lip 802 and is in sliding communication with an open track 804 vertically disposed along the length of the hook lip 801 such that the pad 906 is frictionally received between lips 801 and 802, and the adjusting knob 805 tightened.

Prior art clamps often use a spring loaded clamp that requires the user to spread the clamping members apart with one hand, and then while holding it open, slip over the towed vehicle's brake pedal pad with the other hand and then tighten. This is a difficult procedure given the space limitations in a car being towed. In addition, this procedure is required each time the system is used. Again, the present system is set once as described, and then removed by simply lifting the clamp 800 from the towed vehicle's brake pedal pad 906 by grasping the air cylinder 902 (as will be further described) and gently pulling the cylinder 902 upward. To re-install, the user sets the hook lip 801 over the top of the brake pad 906 and gently pushes down on the air cylinder 902 until the clamp 800 is secure over the brake pad. This overcomes the shortcoming of previous brake actuation systems that require the pedal clamp to be adjusted each time the brake activation system is used.

As such, the current brake pedal clamp 800 is adjusted one time at initial setup. Thus overcoming previous shortcomings and the need for future adjustments. The clamp 800 is loosened and slipped over the top of the brake pedal pad 906 and then squeezed tight on the brake pedal pad and tightened. Once the clamp 800 is set, it is removed by simply lifting it from the bottom.

As illustrated, the actuating force has been lowered on the brake pad 906 via lowering a connection between a clevis 803 and a clevis attachment 904 below the flat lip 802 of the brake clamp 800 and approximately adjacent the lower most end 906a of the brake pad 906. When activation occurs, the brake pedal clamp 800 is actually pushed tighter on the brake pad 906 due to its lowered connection point to the clamp 800. Upon release of the brake activation, the internal spring of the towed vehicle's brake system pushes the towed vehicle's brake to the rest position while an internal spring of the air cylinder 902 pulls the cylinder back to the rest position.

The clevis 803 is attached to the air cylinder 902 via the clevis attachment 904. The operating unit 903 sits on the floorboard of the towed vehicle. As will be seen, when conditions are met for the system 10 to activate and apply the brake in the towed vehicle, air pressure is sent to air cylinder 902 which pushes the brake pedal 906 of the towed vehicle to apply the brakes. As will also be seen, when this activation occurs, the stabilizer cable 908 stabilizes the positioning of the apparatus 10, and in particular, the operating unit 903.

In the preferred embodiment, a firewall clamp 909 of the stabilizing cable 908 is attached to the towed vehicle's firewall with standard self-drilling screw 912. The stabilizing cable 908 further includes a carabineer hook 910 that is clipped to a hole in a bracket 911 at the base of the air cylinder 902. As will be seen, upon activation, air is applied to air cylinder 902 thus applying pressure to the towed vehicle's brake pedal 906.

The firewall clamp 909 is attached to the towed vehicle's firewall in direct line to the base 903a of the control unit 903. Importantly, and unlike the prior art, the stabilizing cable 908 is not required to be in line, or on the same plane with the towed vehicle's brake pedal. As described, the stabilizing cable 908 includes the carabineer hook 910 that is attached to the base of the air cylinder 902. When activation occurs, the present invention pushes against the towed vehicle's brake pedal, and pulls against the stabilizing cable 908 as well as the firewall clamp 909. As a result, the present invention transfers the reaction activation force to the vehicle's firewall rather than pushing against the towed vehicle's front of the seat as in previous brake activation systems. As a result, the operating unit 903 is prevented from moving backwards when the apparatus presses against the towed vehicle's brake pedal. As in many prior art systems, the back surface of the system often rests against the driver's seat or supporting seat rail. Here, the apparatus can rest on the floorboard without the back surface of the control unit 903 being braced against any surface.

Figure 4:
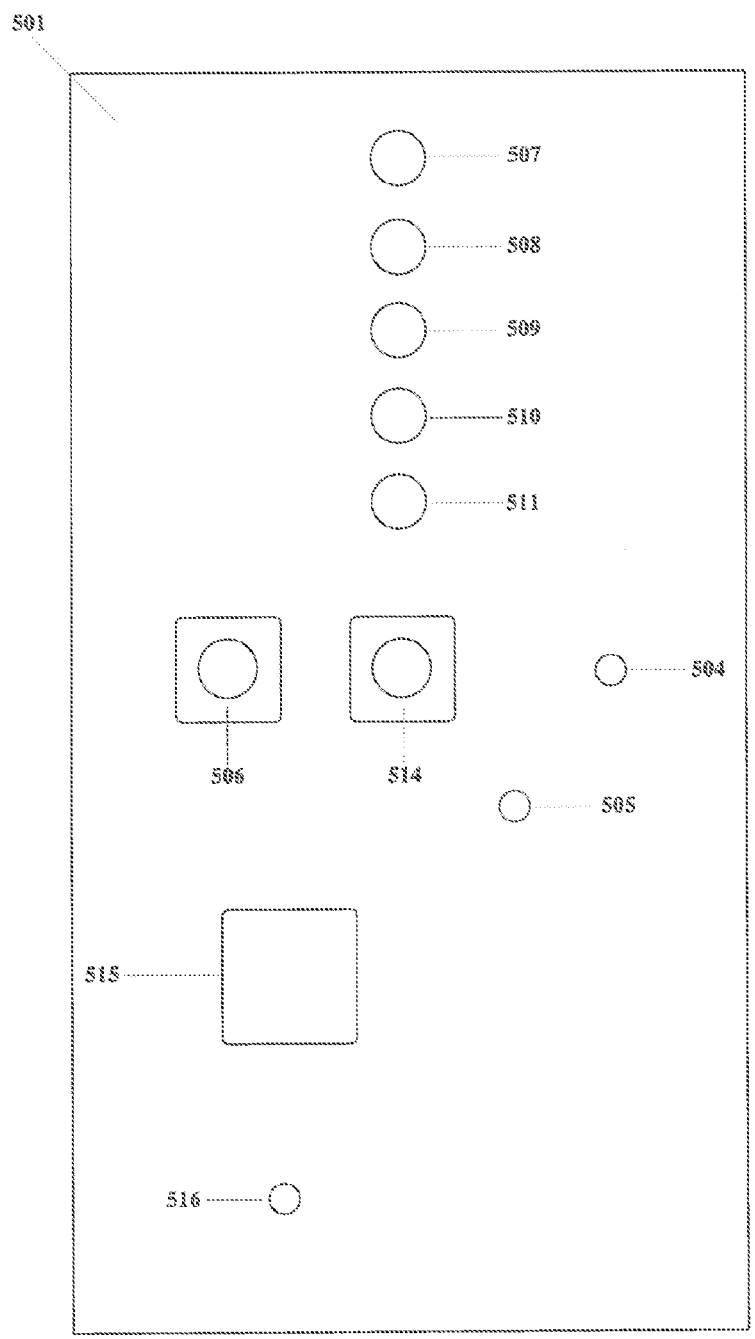
FIG. 4 is a user interface.
Figure 5:
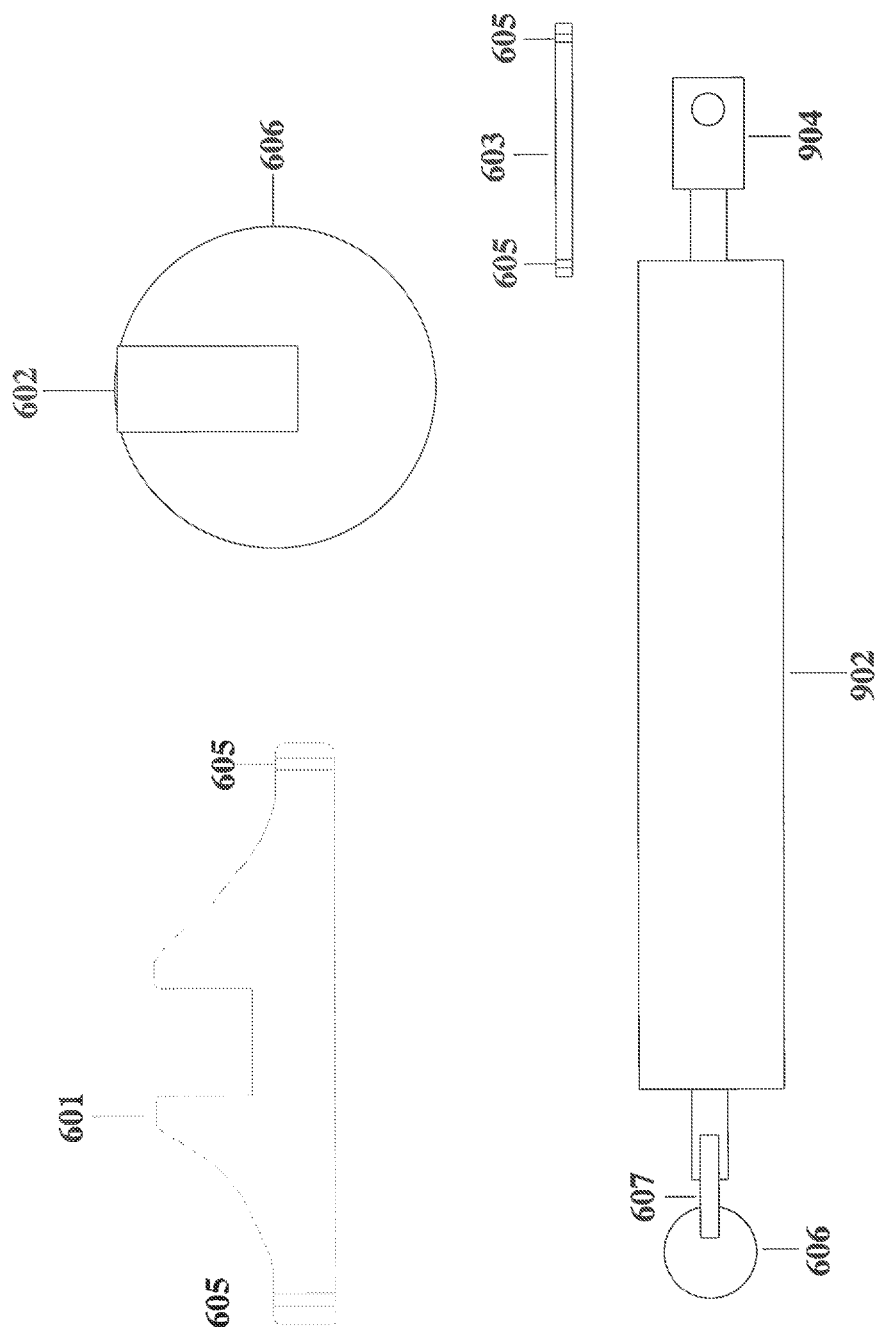
FIG. 5 illustrates a ball and socket actuator mount.

Referring to FIG. 4, the air pressure applied to cylinder 902 is based on the user selected braking profile 507-511 by selector button 506. As pressure is applied to the towed vehicle's brake pedal pad 906, the stabilizer cable 908 transfers reaction to the firewall 907 and supplies a stable anchor point to keep the towed vehicle's brake system in place while in motion being towed. This overcomes shortcomings of previous brake activation systems pushing against the seat of the towed vehicle and damaging the seat. The brake application of the present apparatus, as will be seen, is proportionately more or less depending on the rate of deceleration sensed created in the stopping event.

Cylinder 902 is attached to the operating unit 903 using a ball and socket mount 600, having a ball mount 601, ball 606 and stud 607 with spacer 603 with standard bolts though mounting holes 605. Ball 606 is placed in the ball mount 601 with backer spacer 603 and bolted to the operating unit 903 with bolts common to the industry. Threaded stud 607 is screwed into member 901 of the cylinder 902 and into threaded hole 602 of the ball 606. The ball and socket mount 600 allows for pivotal adjustment of the air cylinder 902, and allows cylinder 902 to articulate as necessary to stay in alignment with brake pedal 906 when setting up for towing. The current invention does not have to sit directly in front of the towed vehicle's brake pedal. As should be understood, this overcomes previous shortcomings requiring previous brake assist systems to be set directly in front of the brake pedal of the towed vehicle making them limited in scope of use in all vehicles commonly towed behind a recreational vehicle. The present invention with the ball and socket cylinder mount overcomes this previous shortcoming by allowing for a wide range of swivel and tilt in all directions to a preferred inclination and orientation. The present invention can be offset to either side of perpendicular to the towed vehicle's brake pedal and still effectively operate the brake pedal in the towed vehicle.

The present invention further incorporates a "valve driver" circuit board 204 incorporating three (3) directional inertia sensing switches 204a, 204b, 204c. The inertia sensing switches 204a, 204b, 204c are mounted on the circuit board 204 at increasing angles to require increased deceleration for each of the inertia switches to make contact during a deceleration event. Each switch controls a different level of air pressure based on the user selected profile. Overall sensitivity of the inertia switches is adjusted via an adjusting knob 516 that increases or decreases the angle of the switch in relation to level. A higher degree of angle of the valve driver board 204 causes more inertia (deceleration of towing vehicle) to be required before the system applies brake pressure to brake pedal 906 in the towed vehicle.

Figure 2:
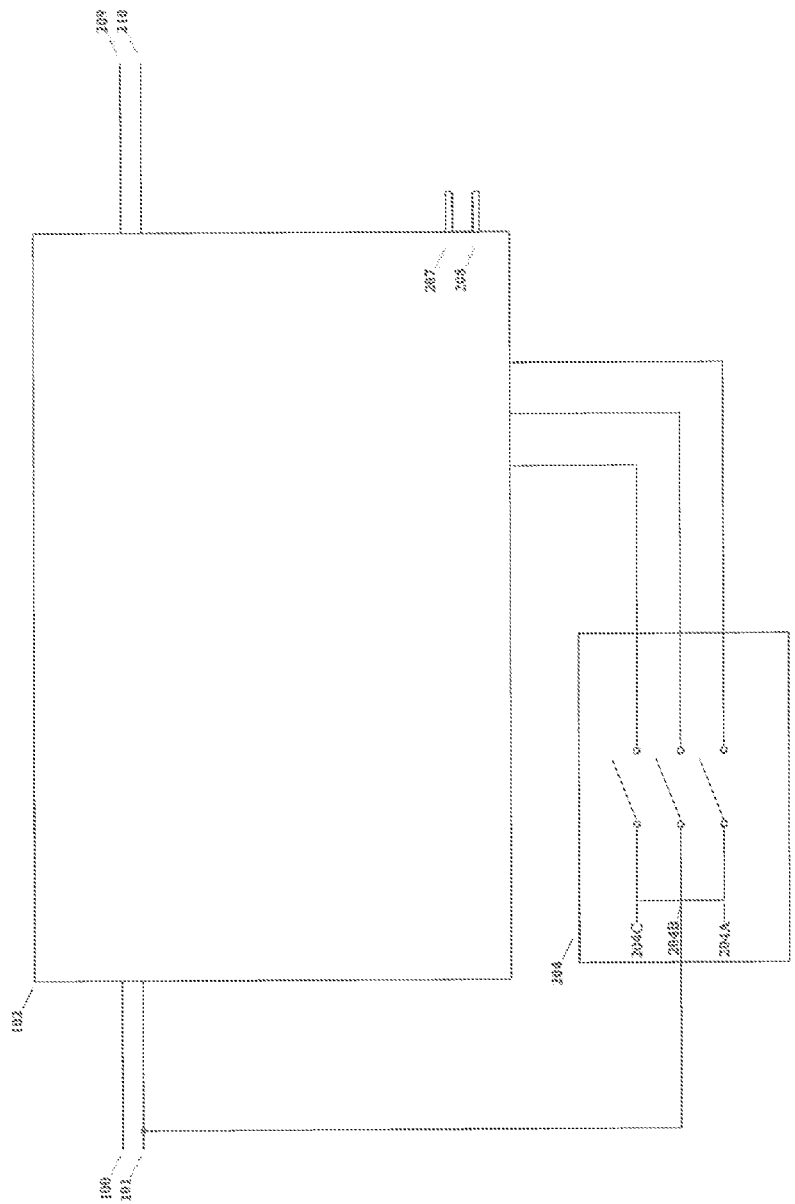
FIG. 2 illustrates an activation circuit for the towed vehicle brake actuation apparatus.
Figure 3:
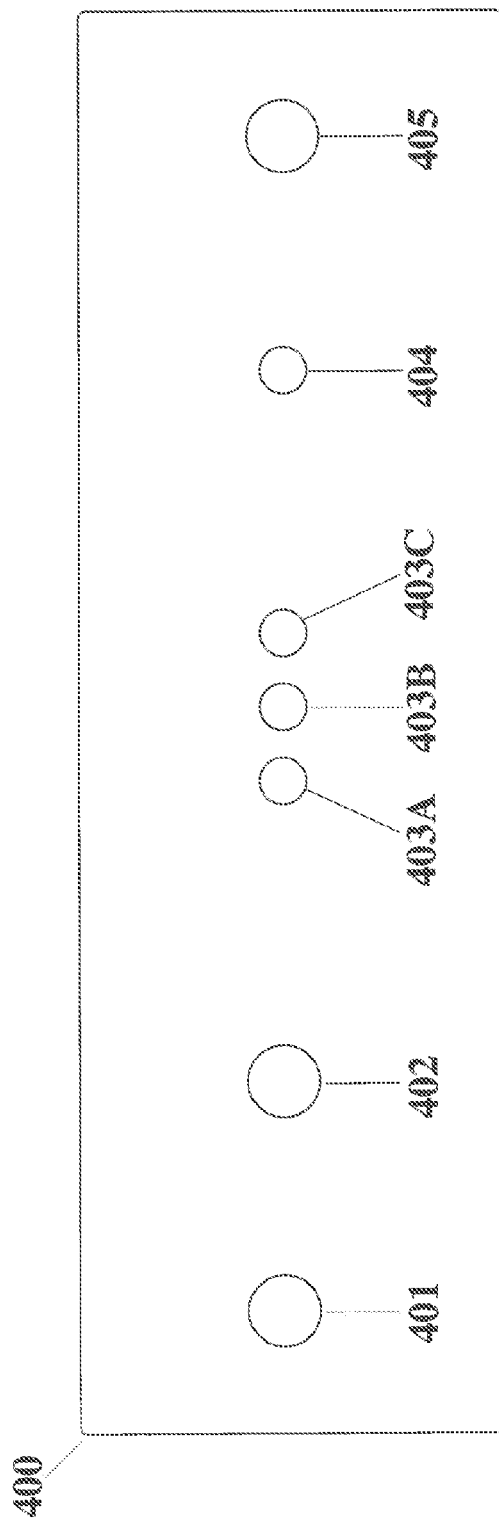
FIG. 3 illustrates a radio receiver module installed in the towing vehicle.

Logic board 102 has a user interface to adjust for the weight of the vehicle being towed. This adjustment is made at the initial set up by the user by adjustment setting button 514. The selection by user is displayed by LEDs 507-511 on user interface panel 501. The adjustment will allow the present invention to pass more or less air pressure from tank 103 to actuator 902 through solenoid valve 108 based on the user setting of the weight of the towed vehicle 507-511. When 12 v power 100,101 (see FIGS. 1 and 2) is applied, the towed vehicle brake system logic board 102 senses the amount of air present in the tank 103 through air sensor 207. If air sensor 207 determines the air pressure is less than 60 PSI, the logic board 102 then sends a 12 v signal to the relay 105 causing the air compressor 104 to turn on until sensor 207 reads 80 PSI in tank 103. A check valve 106, as common to the industry, is installed between the pump 104 and tank 103 to keep air from escaping through pump 104, thereby maintaining air pressure in tank 103 at all times when the towed vehicle's brake system 10 is installed for use.

As stated, valve driver board 204 contains three inertia sensing switches 204a, 204b, 204c. As deceleration is created and sensed during a stopping event, the valve driver 204 senses which inertia sensing switch is active from the level of deceleration and supplies the 12 v signal to the logic board 102. The logic board then supplies the air pressure to the cylinder 902 and applies the towed vehicle brakes based on which inertia sensing switch is active and the amount of air pressure sent to the cylinder 902. The overall sensitivity is set at the initial setup for towing by the adjusting knob 516 and can be fine-tuned as the user uses the apparatus 10.

The knob 516 is turned one way or the other to change the valve driver angle from level. A lower degree of angle from level causes the apparatus 10 to be less sensitive meaning more deceleration is required to cause activation. Likewise, a higher angle from angle from level causes the apparatus 10 to activate with less deceleration. Because the apparatus 10 is activated by tilting the valve driver, activation could occur with little or no deceleration thereby causing unwanted activation of the apparatus 10.

As a recommended option, the user can supply an additional signal from the towing vehicle's brake lights. This optional signal is then plugged into the operating unit 903 at the time of setup. The logic board 102 then switches to dual signal mode. In dual signal mode, both deceleration and brake lights from the towing vehicle are required before the apparatus 10 is activated. This will eliminate unwanted activation while traveling down a steep grade or over undulating terrain.

As stated, a 12 v signal is passed to logic board 102 based on the deceleration sensed. Based on the user's setting for weight by selector 516 and the amount of deceleration sensed by valve driver 204, a predetermined rate of air pressure is sent to cylinder 902 and monitored and maintained by air pressure sensor 207 through solenoid valve 109. As deceleration changes during the stopping event of the towed vehicle, brake effort supplied will also change. Logic board 102 monitors output from valve driver 204 in real time. As the rate of deceleration changes more or less air is supplied to increase or decrease the pressure applied to pedal 906 in real time. This overcomes the prior art shortcoming of requiring the apparatus to reset itself after each brake activation thereby creating a real time floating amount of brake effort in the vehicle being towed.

Radio transmitter 913 sends signals to a receiver 400 in the towing vehicle to alert the user of the condition of operating unit 903.

Fault 404 triggers for the receiver 400 are:
1. False or not required activation occurred, but air sensor 207 on logic board 102 senses greater than 0 PSI. This alerts the towing vehicle that the towed vehicle's brake system is activated when it is not supposed to be.
2. Air sensor 208 on logic board 102 senses less than 50 PSI. This alerts the towing vehicle that the towed vehicle's brake system should have turned on air compressor 103 to fill tank 104 but it did not.

Trigger 405 informs the user that the breakaway emergency input 504 is active.

The emergency input 504 alerts the user that the towed vehicle has become disconnected from the towing vehicle.

Radio transmitter 913 sends brake activation level codes 403A, 403B, 403C to show which level of braking 204a-204c is being applied to brake pedal 906.

Link light 402 is illuminated when transmitter 913 has 12 volts applied. This informs the user that the brake system is in range and communicating to the receiver 400.

LED 401 is illuminated when 12 v is supplied to the receiver 400.

In setting up a vehicle to be towed, the towed vehicle must be wired from the towing vehicle to allow the brake lights, directional turn lights and running light from the towing vehicle to be transferred to the towed vehicle while being towed via a "towing wire." As an optional connection to the tow wiring, the brake system 10 can be set to require the brake signal from the towing vehicle before the present brake actuation system will apply the brakes in the towed vehicle. In this case, both the brake lights from the towing vehicle and a sensed deceleration from a stopping event must be present for the brake actuation apparatus to activate the towed vehicle's brakes. Optional connection is made by connecting the inertia circuit board 204 to the brake signal 209 and/or emergency signal 210 from the towing vehicle though logic board 102 via plug in jack 504.

The present invention will apply brake effort based on which inertia switches are activated. Level 1(204a), level 2(204b), or level 3(204c). The level of brake effort is controlled first by which level is activated by deceleration created in stopping the towed vehicle with level 3 requiring the greatest amount of inertia to cause activation. Secondly, the valve driver can be adjusted from level by turning adjusting knob 516. By creating a higher degree of tilt, more inertia will be required for the brake actuation system to become activated.

The inertia switches signal the logic board 102 to apply brake effort in the towed vehicle based on which inertia switch senses deceleration.

Logic board 102 receives the 12 v input from the valve driver 204. Logic Board 102 contains air sensor 208 to monitor air pressure in air tank 103 and air sensor 207 to monitor air pressure in air cylinder 902. A user interface 501 exists on logic board 102 to allow for adjustments to the air pressure going to cylinder 902 based on the weight of the towed vehicle by selecting the braking profile 501-511 on user interface 501 using selector 506. 10% more air pressure for each braking profile 501-511 can be selected for more brake effort from the present invention by using the boost selection 514. This provides the ability for the user to fine tune the apparatus 10 to their exact needs.

LED 505 is illuminated when boost feature 514 is selected.

FIG. 8 shows a process for installing the brake activation apparatus 10 into a towed vehicle. At block 150, the operating unit 903 is placed on the floorboard of the towed vehicle. In that position, the bottom surface of the unit 903 rests on the vehicle's floorboard and the side of the unit 903 having the cylinder 902 attached is facing the towed vehicle's brake pad. At the same time, the user can make any appropriate connections. In the described example, the unit can be plugged into a 12 v receptacle to power the apparatus, and for example, the optional signal from the towing vehicle's brake lights may be plugged into the operating unit 903.

At block 152, the air cylinder 902 is positioned with the brake pad via the ball and socket cylinder mount 600, so that the clamp 800 is positioned for attachment to the towed vehicle's brake pad.

At block 154, the clamp 800 is slipped over the towed vehicle's brake pad, the top of the clamp first, then pushing down on the cylinder to slip the lower lip of the clamp under the brake pad.

At block 156, the carabineer hook 910 is attached to the bracket 911 of the air cylinder 902 to secure the apparatus 10 in place.

At block 158, the apparatus 10 is initialized using an initialized button 515 that bleeds the towed vehicle booster of vacuum and self-aligns the apparatus 10 to the firewall clamp.

At block 159, the weight of the towed vehicle is selected to select a predetermined braking profile. Each selection uses a preset profile which determines the air pressure sent to the cylinder based on which level of activation is sensed by the valve driver.

At block 160, the installation state of the apparatus can be checked using any available sensors. If the air cylinder is in place and the apparatus is communicating properly to the receiver 400, then the apparatus can indicate the initialization is complete 162 and be ready for the tow vehicle to be underway.

Although the above description contains many specificities, these should not be construed as limiting the scope of the invention but as merely providing illustrations of some of the presently preferred embodiments of this invention. As such, it is to be understood that the present invention is not limited to the embodiments described above, but encompasses any and all embodiments within the scope of the claims.

It would be obvious to those skilled in the art that modifications may be made to the embodiments described above without departing from the scope of the present invention. Thus the scope of the invention should be determined by the appended claims in the formal application and their legal equivalents, rather than by the examples given.

I claim:

1. An apparatus for braking a towed vehicle comprising: an operating unit,
an air cylinder having a first end attached to the operating unit and an opposite end for contacting a brake pedal of the towed vehicle,
a stabilizing cable having one end for attaching to a firewall of the towed vehicle and an opposite end releaseably attached to the apparatus, wherein said opposite end of the air cylinder includes a first attachment to a brake pedal clamp, said brake pedal clamp comprising a lower end having an adjusting knob that is in sliding communication with an open track of an upper end, said upper and lower ends for adjustably receiving the brake pedal of the towed vehicle, wherein tightening the adjusting knob secures the towed vehicle's brake pedal within said brake pedal clamp.

2. The apparatus as recited in claim 1, wherein said air cylinder is attached to the brake pedal clamp at a location below the lower end and approximately adjacent a lower most end of the towed vehicle's brake pedal.

3. The apparatus as recited in claim 2, wherein said first attachment is a clevis.

4. The apparatus as recited in claim 3 wherein the opposite end of the stabilizing cable includes a second attachment to a bracket at a base of said air cylinder.

5. The apparatus as recited in claim 4, wherein said second attachment is a carabineer hook.

6. The apparatus as recited in claim 5, wherein said air cylinder applies pressure to drive the brake pedal clamp in a direction towards the towed vehicle's brake pedal and said pressure being applied against the towed vehicle's firewall.

7. The apparatus as recited in claim 6, further comprising a valve driver having a plurality of inertia sensing switches for controlling the level of pressure applied.

8. The apparatus as recited in claim 1, wherein said first end of said air cylinder includes a ball and socket mount configured to attach to the operating unit, said ball and socket mount comprising a ball member that is received in a ball mount, and disposed within opposite mounting holes and bolts for connecting to the operating unit, and a threaded stud having a first end threadably received within a threaded bore of said ball, and a second end threadably received with a threaded member of said air cylinder.

9. The apparatus as recited in claim 8, wherein said ball and socket mount configured for pivotal adjustment of the air cylinder.

10. An apparatus for braking a towed vehicle comprising: an operating unit,
an actuator having a first end attached to the operating unit and an opposite end connected to a brake pedal clamp comprising a lower end having an adjustment knob that is in sliding communication with an open track of an upper end, wherein said upper and lower ends for adjustably receiving a brake pedal of the towed vehicle, a stabilizing cable having one end configured to attach to a firewall of the towed vehicle, and an opposite end releaseably attached to the apparatus, and wherein said actuator is attached to the brake pedal clamp at a location below the lower end and approximately adjacent a lower most end of the towed vehicle's brake pedal.

11. The apparatus as recited in claim 10, wherein the actuator applies pressure to drive the brake pedal clamp in a direction towards the towed vehicle's brake pedal and said pressure being applied against the towed vehicle's firewall.

12. The apparatus as recited in claim 11, wherein said first end of said actuator includes a ball and socket mount comprising a ball member that is received in a ball mount, said ball mount including mounting holes and bolts for connection to the operating unit and a threaded stud configured to threadably attach the ball member to a threaded member of said actuator.

13. The apparatus as recited in claim 12, wherein said ball and socket mount configured for pivotal adjustment of the actuator.

14. The apparatus as recited in claim 13, further comprising a valve driver having a plurality of inertia sensing switches for controlling the level of pressure applied.

15. A method comprising:
applying pressure to an actuation arm of a brake actuation apparatus to actuate a brake of a towed vehicle through a brake pedal of the towed vehicle, the actuation arm having an end connected to and extending from an operating unit with the operating unit configured to engage a stabilizing cable having one end attached to a firewall of the towed vehicle and an opposite end releaseably attached to the actuation arm, wherein the actuation arm is attached to a brake pedal clamp in contact with the towed vehicle's brake pedal at a location below the brake pedal clamp and approximately adjacent a lower most end of the towed vehicle's brake pedal, and wherein the actuation arm applies pressure to drive the brake pedal clamp in a direction towards the towed vehicle's brake pedal and said pressure being applied against the towed vehicle's firewall.

16. The method of claim 15, wherein said end of said actuation arm configured for pivotal adjustment of the actuation arm.

17. The method of claim 16, further comprising selecting from a plurality of inertia sensing switches for controlling the level of pressure the actuation arm applies.

* * * * *